2,564,132

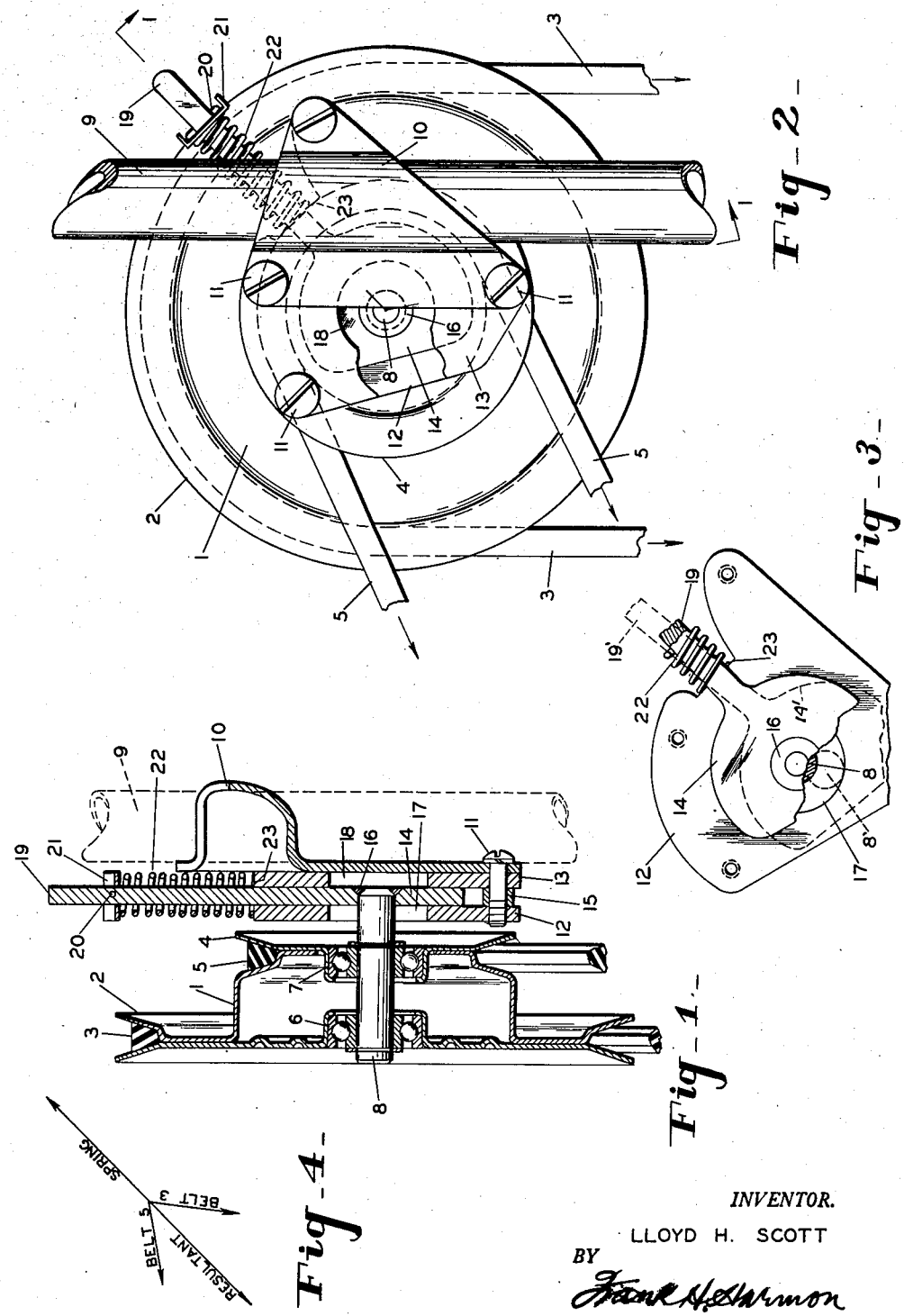
Aug. 14, 1951  L. H. SCOTT  2,564,132
AUTOMATIC TENSIONING DEVICE
Filed Sept. 24, 1949
INVENTOR.
LLOYD H. SCOTT
BY
Frank H. Harmon
ATTORNEY Patented Aug. 14, 1951

UNITED STATES PATENT OFFICE 2,564,132

AUTOMATIC TENSIONING DEVICE

Lloyd H. Scott, Chagrin Falls, Ohio, assignor to Jack & Heintz, Inc., Cleveland, Ohio, a corporation of Ohio Application September 24, 1949, Serial No. 117,532

5 Claims. (Cl. 74—242.8)

This invention relates in general to tensioning devices and more particularly to improvements in devices for automatically maintaining the tension of belts, or chains, disposed about pulleys, or sprockets, and the like.

One of the primary objects of my invention is to provide in conjunction with pulleys or sprockets carrying separate driving and driven belts, or chains, a single resilient means for automatically, simultaneously and independently maintaining constant tension of the belts, or chains.

Another object of my invention is to provide a single self-contained device for automatically, simultaneously and independently, maintaining constant the tension of a plurality of belts, or chains, disposed in planes at angles to each other about pulleys, or sprockets.

Another object is to provide in such an automatic tensioning device, a compound drum to include two relatively rigid pulleys, or sprockets, each to accommodate one of the two relatively angularly disposed belts, or chains, and a single resilient tensioning means so angularly disposed with respect to the planes of disposition of both belts, or chains, as to automatically maintain constant tension of both belts, or chains simultaneously and independently of each other.

A further object is to provide in such a device, a stationary shaft for rotatably carrying the compound pulleys, or sprockets, and a member rigid with the shaft and confined for sliding movements, within positive limits in any direction in a single plane of movement between two stationary frame elements, against the action of the single resilient means carried by the shaft member and the stationary frame elements.

With the foregoing and other objects in view, the invention resides in the combination of parts and in the details of construction, hereinafter set forth in the following specification and appended claims, certain embodiments thereof being illustrated in the accompanying drawings, in which:

Figure 1 is a section taken along line 1—1 of Figure 2, showing a compound drum, including the two relatively rigid belt receiving pulleys, mounted on bearings on the stationary shaft and resilient tensioning device carried by the shaft;

Figure 2 is a view in side elevation of the same, partly broken away;

Figure 3 is a fragmentary side view of the resilient tensioning device, showing the inboard plate and sliding plate, and in full lines a normal position of automatic adjustment, and in dotted lines, an extreme position of automatic adjustment; and Figure 4 is a diagrammatical representation of the opposing forces of the two belts and the resilient tensioning spring and the resultant.

Referring more particularly to the drawings, one form that my invention may take includes a drum 1 having two pulleys 2 and 4. Pulley 2 may receive a belt 3 driven by a driven pulley, not shown, and pulley 4 may receive a belt 5 for driving a pulley, not shown. The drum, or compound pulley 1, is mounted to rotate on bearings 6 and 7 on a stationary stub shaft 8.

To a stationary frame strut 9 is releasably secured a clamping bracket 10 by means of bolts 11, which also secure to the bracket a pair of stationary parallel plates separated by a spacer 15.

To the outboard end of stub shaft 8 is secured a flat plate 14 by welding, or otherwise, as indicated at 16. This plate 14 is positioned between plates 12 and 13 with sliding clearance, provided by the width of spacer 15. Rigid with plate 14 is tongue 19 that extends outwardly beyond the confines of plates 12 and 13. Surrounding tongue 19 is a compression coil spring whose outer end bears against a spring retainer 21 secured to the tongue 19 by a pin 20. The inner end of spring 22 bears against a spring retainer 23 carried by the adjacent, but spaced, outer edges of plates 12 and 13.

The inboard plate 12 is provided with a substantially centrally located circular opening 17 through which the stub shaft 8 passes with clearance equal to several times the outside diameter of the shaft. This clearance of the stub shaft in opening 17 of inboard acts as a positive limit of relative sliding movement of non-rotating shaft 8 and its plate 14 relative to plates 12 and 13. Outboard plate 13 has a similar opening 18, inasmuch as plates 12 and 13 are interchangeable.

Figure 2 shows the driven pulley 2 with its driving belt 3 disposed in one plane and the arrows at each end of the broken-off portions of belt 3 indicate the direction of the tension pulling force of its driving pulley, not shown. Likewise, the arrows at the broken-off portions of belt 5, driven by driving pulley 4, show the direction of the tension pulling forces of its driven pulley, not shown, to be at an angle to that exerted on belt 3.

The angle of disposition of the tongue 19 and its compression coil spring 22 is at an angle to both belts 3 and 5, as shown in Figures 2 and 4. In Figure 3, in full lines, the stub shaft 8 is shown centrally disposed in the opening 17 of the inboard plate 12 and slidable plate 14 and tongue 19 are also shown in full lines in corresponding positions, representing those assumed under normal predeterminedly adjusted conditions.

As stated before, plate 14 may slide in any direction in the plane of the plate, limited only by the clearance between the stub shaft and opening 17 in plate 12, while spring 22 urges the slidable plate 14 in a fixed direction.

Referring again to Figure 3, stub shaft 8, in response to an unequal pulley tension pull between belts 3 and 5, has assumed an offset position, indicated at 8' in dotted lines against the inner surface of opening 17 of inboard plate 2, and plate 14 and the spring carrying tongue 19 have also shifted into positions indicated in dotted lines at 14' and 19', respectively.

Thus, the stub shaft can slide to simultaneously maintain proper tensions on both belts, independently of each other. The pulley shaft 8 is held square by sliding plate 14, independently of the position of the shaft. As shown in Figures 2, 3, and 4, the angle of the spring carrying tongue 19 is so chosen that it is in direct opposition to the vector sum of the desired belt tensions. Specifically in Figure 4, the arrows labelled "Belt 3" and "Belt 4" represent the angular directions of pulley tension pull, while the arrow labelled "Resultant" indicates the vector sum of the desired belt tensions. The arrow labelled "Spring" is a continuation of the line of the "Resultant" arrow and in direct opposition thereto. Thus, the single spring 22 serves to insure and maintain constant correct tensions on both belts automatically simultaneously and independently of each other.

I have found my new and novel automatic tensioning device to be particularly suitable for use in automotive vehicles, such as engine powered bicycles, motorcycles, scooters and the like, wherein belt 3 is driven by an engine driven pulley to drive pulley 2, and pulley 4, rigid with pulley 2, and wherein belt 5 drives a pulley that drives the vehicle driving road wheel. In such vehicles, tensioning devices have been employed for tensioning a single belt, or chain. However, never to my knowledge, has there been provided a single tensioning device for automatically, simultaneously and independently maintaining constant correct tensioning of two such belts, or chains, as 3 and 5 disposed in planes at angles to each other.

From the foregoing, it will be seen that, regardless of whether drums, pulleys, sprockets, belts, cables or chains are employed, I have provided a simple, single, unitary self-contained resilient device for maintaining constant correct tensions of two angularly disposed belts, cables, chains or the like disposed about driving, or driven, pulleys, drums, sprockets, or the like, automatically, simultaneously and independently of each other. I have shown, as one form my invention may take, one drum with two pulleys, rigid with each other, and two belts. It is to be understood that my invention is not limited to two pulleys that are rigid with each other. Neither is it limited to pulleys and belts. It embraces drums and sprockets, as well as pulleys, and cables and chains, as well as belts. For the lack of an appropriate generic term for pulleys, drums and sprockets, I shall use in my claims the term "pulley" to embrace drums, pulleys and sprockets as a generic term. Likewise, in the claims, I shall use the term "belt" as a generic term to embrace belts, cables and chains.

I claim:

1. In a power transmission device, a pair of pulleys rotatably mounted about a common non-rotating shaft, a pair of parallel stationary spaced guide plates, said shaft extending with appreciable clearance through an opening in the inner of said two guide plates and rigidly carrying a plate slidable between said two guide plates, said slidable plate having a tongue extending outwardly past the peripheries of said guide plates and carrying the outer end of a compression coil spring whose inner end bears against the peripheries of said guide plates, one of said pulleys carrying a belt driven by a power source and the other pulley carrying a driving belt.

2. In a power transmission device, a pair of pulleys rotatably mounted about a common non-rotating shaft, a pair of parallel stationary spaced guide plates, said shaft extending with appreciable clearance through an opening in the inner of said two guide plates and rigidly carrying a plate slidable between said two guide plates, said slidable plate having a tongue extending outwardly past the peripheries of said guide plates and carrying the outer end of a compression coil spring whose inner end bears against the peripheries of said guide plates, one of said pulleys carrying a belt driven by a power source and the other pulley carrying a driving belt, said slidable plate being adapted to slide, within limits defined by the clearance of said shaft in the opening of the inner of said guide plates, in response to variations in tension pulls of said belts and said spring being adapted to automatically, simultaneously and independently adjust and maintain predetermined tensions in both of said belts.

3. In a power transmission device, a pair of pulleys rotatably mounted about a common non-rotating shaft, a pair of parallel stationary spaced guide plates, said shaft extending with appreciable clearance through an opening in the inner of said two guide plates and rigidly carrying a plate slidable between said two guide plates, said slidable plate having a tongue extending outwardly past the peripheries of said guide plates and carrying the outer end of a compression coil spring whose inner end bears against the peripheries of said guide plates, one of said pulleys carrying a belt driven by a power source and the other pulley carrying a driving belt disposed in a plane at an angle to the plane of disposition of said driven belt, said slidable plate being adapted to slide, within limits defined by the clearance of said shaft in the opening of the inner of said guide plates, in response to variations in tension pulls of said belts and said spring being adapted to automatically, simultaneously and independently adjust and maintain predetermined tensions in both of said belts.

4. In a power transmission device, a pair of pulleys rotatably mounted about a common non-rotating shaft, a pair of parallel stationary spaced guide plates, said shaft extending with appreciable clearance through an opening in the inner of said two guide plates and rigidly carrying a plate slidable between said two guide plates, said slidable plate having a tongue extending outwardly past the peripheries of said guide plates and carrying the outer end of a compression coil spring whose inner end bears against the peripheries of said guide plates, one of said pulleys carrying a belt driven by a power source and the other pulley carrying a driving belt extending at an angle to said driven belt, said tongue and spring being disposed at an angle to the planes of disposition of both of said belts, said slidable plate being adapted to slide, within limits defined by the clearance of said shaft in the opening of the inner of said guide plates, in response to variations in tension pulls of said belts and said spring being adapted to automatically, simultaneously and independently adjust and maintain predetermined tensions in both of said belts.

5. In a power transmission device, a pair of pulleys rotatably mounted about a common nonrotating shaft, a pair of parallel stationary spaced guide plates, said shaft extending with appreciable clearance through an opening in the inner of said two guide plates and rigidly carrying a plate slidable between said two guide plates, said slidable plate having a tongue extending outwardly past the peripheries of said guide plates and carrying the outer end of a compression coil spring whose inner end bears against the peripheries of said guide plates, one of said pulleys carrying a belt driven by a power source and the other pulley carrying a driving belt extending at an angle to said driven belt, said tongue and spring being disposed at an angle approximately in direct opposition to the vector sum of the angles of tension pulls of both of said endless belts, said slidable plate being adapted to slide, within limits defined by the clearance of said shaft in the opening of the inner of said guide plates, in response to variations in tension pulls of said belts, said spring being adapted to automatically, simultaneously and independently adjust and maintain predetermined tensions in both of said belts.

LLOYD H. SCOTT.

REFERENCES CITED

The following references are of record in the file of this patent:

UNITED STATES PATENTS

| Number | Name | Date |
|---|---|---|
| 151,705 | Jewett | June 9, 1874 |
| 1,374,643 | Fischbach | Apr. 12, 1921 |
| 1,430,716 | Anderson | Oct. 3, 1922 |
| 2,385,223 | Moore | Sept. 18, 1945 |